July 30, 1968 V. L. RUGEN ET AL 3,394,948
DRAFT LINK CONSTRUCTION
Filed Sept. 23, 1966
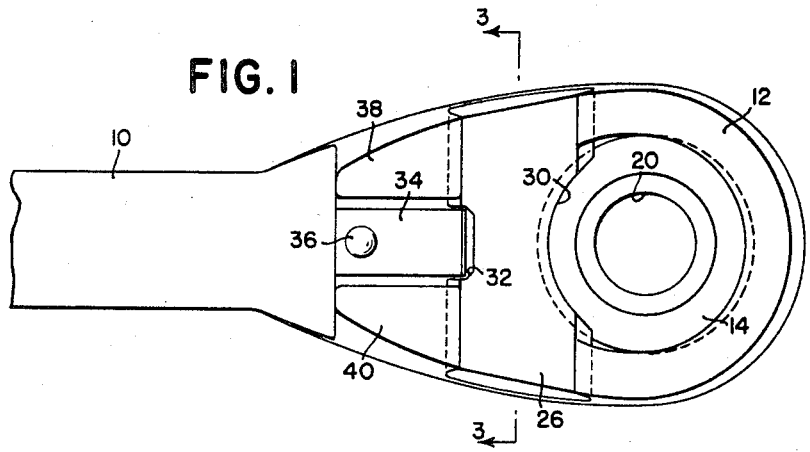
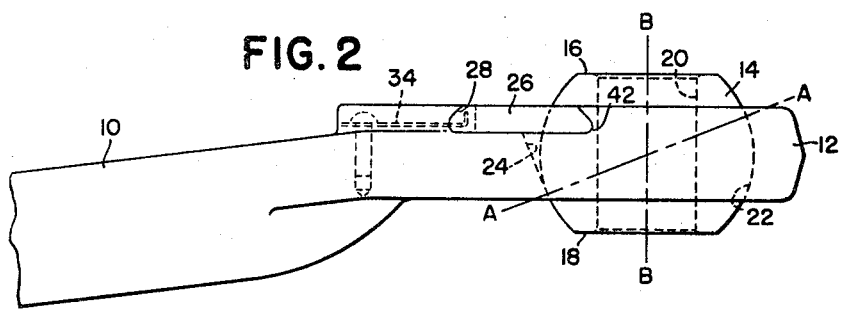
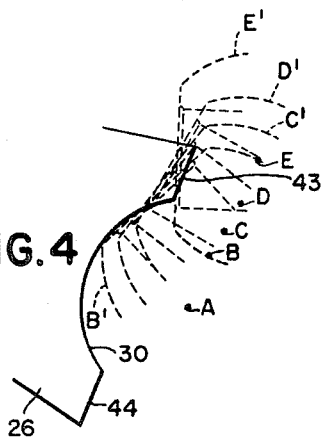
INVENTORS.
VERNON L. RUGEN
NORMAN F. LEMMON
BY
ATTORNEY United States Patent Office 3,394,948
Patented July 30, 1968

3,394,948
DRAFT LINK CONSTRUCTION
Vernon Louis Rugen and Norman Frederick Lemmon,
Cedar Falls, Iowa, assignors to Deere & Company,
Moline, Ill., a corporation of Delaware
Filed Sept. 28, 1966, Ser. No. 582,567
3 Claims. (Cl. 280—415)

ABSTRACT OF THE DISCLOSURE

A draft link provided with a ball and socket joint for the connection of implements in which the ball is removable to provide for the interchangeability of balls having holes of different category sizes and in which the ball can be positively locked within the socket.

The present invention relates generally to tractor hitches of the type referred to as three-point hitches, and more particularly to lower draft links of three-point hitches.

A three-point hitch includes one upper link and two lower links, each articulated to the tractor at the forward end of the link and provided with ball joints at the rear ends to which implements may be secured, the ball joints providing for limited universal movement. The balls of the joints are received within spherical sockets in the ends of the links and each ball (actually a segment of a sphere) is provided with an axially extending hole for receiving a lynch pin carried by the implement. Three different sizes or categories of hitches have now been established, each category requiring different diameters of holes within the balls, and also different ranges of lengths of the holes. Thus a category I hitch requires a hole diameter of between 0.88 and 0.89 inch with a length of between 1.37 and 1.38 inches, a category II hitch requires a hole diameter of between 1.13 and 1.14 inches and a length of between 1.37 and 1.76 inches (but in actual practice usually between 1.74 and 1.76) and a category III hitch requires a hole diameter of between 1.45 and 1.46 inches and a hole length of between 1.74 and 1.76 inches. (These standards are found in ASAE Standard S217.5, reprinted on pages 234–236 of the 1966 agricultural engineers' yearbook.)

To make hitches of different category sizes it is necessary to remove the ball having a hole of one category size and replace it with a ball having a hole of a different category size. One prior art construction designed for receiving balls of different category sizes is shown in the Foxwell Patent 3,151,882.

It is an object of the present invention to provide an improved lower link construction suitable for receiving balls of different category sizes.

More particularly it is an object of this invention to provide a lower link construction suitable for receiving balls of different category sizes which has improved locking means.

These and other objects and advantages of this invention will be apparent to those skilled in the art after a consideration of the following detailed description, taken in conjunction with the accompanying drawings in which the preferred form of this invention is illustrated.

FIG. 1 is a side view of the rear end of a lower draft link in which the principles of the present invention have been incorporated.

FIG. 2 is a top view of the link shown in FIG. 1.

FIG. 3 is a sectional view taken along the lines 3—3 in FIG. 1, the locking element being removed for purposes of clarity.

FIG. 4 is a schematic view illustrating the manner in which the locking element is removed or inserted when balls of a larger category size are disposed within the ball-receiving recess at the end of the draft link.

As shown in the drawings the draft link 10 is provided with an enlarged rear end portion 12 that is apertured for the receipt of ball 14. The ball 14 illustrated in the drawings (which are on a reduced scale) is of a category II size having a preferred length between faces 16 and 18 of 1.75 inches. If the ball were designed for category I size, the distance between the opposed faces 16 and 18 would be less and the diameter of the bore 20 would also be less in accordance with the dimensions previously set forth.

The ball 14 is received within a recess in the end portion 12, the recess being formed of a spherical portion 22 below the plane A—A (FIG. 2) and a cylindrical portion 24 above the plane A—A. As can be seen from FIG. 2 both the spherical portion and the cylindrical portion have the same diameters and the line upon which they intersect is disposed entirely within the end portion 12. The cylindrical portion permits loading of the ball 14 within the socket.

To retain the ball 14 within the socket a locking element or ball retainer 26 is provided which is received within a keystone-type slot 28 disposed forwardly of the socket 22, 24. The keyway 28 intersects the socket and therefore it is necessary that the key or ball retainer 26 be provided with a recessed portion which will preferably conform to the ball 14. Thus the retainer 26 is provided with a spherical recess on its rearward edge which is indicated at 30. The forward edge of the retainer 26 is provided with a notch 32 and a spring 34 which is secured to a forward portion of the enlarged rear end 12 by means of a stud 36 between shouldered portions 38 and 40 is received within the notch 32 to keep the ball retainer in place.

In order to insert or remove the ball retainer 26 it is necessary to position the ball 14 in such a manner that the line B—B along the axis of the bore 20 passes through the rear edge 42 of the key 26 and is generally perpendicular thereto. It is possible when using balls of the category I size that the distance between the center of the ball and the faces 16, 18 may be less than the distance between the center of the recess 22 and the rear edge 42. If this is the case, then to remove the ball it is only necessary to position the ball with the line B—B perpendicular to the rear edge 42, to slide the key out, and then lift the ball out of the socket through the cylindrical portion 24.

When using balls of a larger category size where the distance between the center of the ball and the faces 16, 18 is greater than the distance between the center of the recess 22 and the rear edge 42, it is necessary to rotate the ball within its socket as the key is being removed. This is shown schematically in FIG. 4, however it should be noted with reference to this figure that while the key 26 is shown stationary and the ball 14 is shown with its center in various positions along the line ABCDE, that actually the center of the ball remains stationary as the key is moved along a line parallel to the line ABCDE. Thus when using balls of the larger sizes, it is necessary to rotate the ball 14 as the key is moved into or out of position. To permit rotation, the ends 43, 44 to either side of the cut-out portion 30 of the key 26 are so dimensioned that they may be received within the aperture 20 of the ball 14. Thus when it is desired to remove a ball 14 of the category II size having the preferred dimension of 1.75 inches between faces 16 and 18, it is necessary to position the ball in such a manner that the line passing along the axis of the bore 20 is at a slight angle so that as the key 26 is moved from its center position A to an outer position B, the end 43 will enter into the bore of the ball as indicated at B'. Continued movement of the key corresponding to distances BC, CD, and DE will cause the ball to rotate within the socket to positions indicated at C', D', and E' until finally the key 26 is free to be removed from the keyway 28. Once the key has been removed it is only necessary to lift the ball 14 out through the cylindrical portion 24 and to insert a ball of the desired category size.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A draft link having a socket at one end, said socket intersecting both sides of said link, a ball positioned within said socket, said socket having an enlarged opening on one side of said link to allow removal of said ball and the socket on the other side of said link closely conforming to said ball, said ball being provided with a through opening extending diametrically thereof, keyway means extending along said one side of said link and intersecting the enlarged opening of said socket, key means slidably mounted in said keyway means, said keyway means restricting the key means to movement longitudinally of said keyway means, means to restrain said key means from longitudinal movement within said keyway means, and a portion of said key means which is disposed adjacent the point where said keyway means intersects said socket providing a bearing surface which prevents displacement of said ball from said socket.

2. The draft link construction set forth in claim 1 wherein that portion of said socket on one side of a plane extending diagonally between the open ends of said socket is of spherical configuration while that portion of said socket on the other side of the plane is of cylindrical configuration, the cylindrical portion of said socket constituting the enlarged opening on said one side of said link.

3. The draft link construction set forth in claim 1 wherein said keyway means and said key means are of dovetail configuration.

References Cited

UNITED STATES PATENTS 3,151,882  10/1964  Foxwell et al. _____ 280—415
3,226,818   1/1966  Abbott _____ 280—415 X LEO FRIAGLIA, *Primary Examiner.*